United States Patent [19]

Nishio

[11] Patent Number: 4,503,958
[45] Date of Patent: Mar. 12, 1985

[54] CONTROL LEVER ASSEMBLY FOR LAWN MOWERS

[75] Inventor: Tadashi Nishio, Tokyo, Japan

[73] Assignees: Starting Industry Company Limited, Tokyo; Nissan Kogyo Co., Ltd., Nagano, both of Japan

[21] Appl. No.: 423,717

[22] Filed: Sep. 27, 1982

[30] Foreign Application Priority Data

May 25, 1982 [JP] Japan .................................. 57-88352

[51] Int. Cl.³ ............................................. B60K 41/24
[52] U.S. Cl. .................................... 192/12 R; 56/11.3; 74/475; 74/477; 74/529
[58] Field of Search ................. 192/12 R, 17 R, 18 R, 192/99 S, 0.094, 4 A; 74/529, 477, 475; 56/10.5, 10.8, 11.3

[56] References Cited

U.S. PATENT DOCUMENTS 4,327,539 5/1982 Bricko et al. .................... 56/10.8
4,362,228 12/1982 Plamper et al. .................. 192/0.094
4,363,206 12/1982 Schmitt .............................. 56/11.3

Primary Examiner—George H. Krizmanich
Attorney, Agent, or Firm—Laurence R. Brown

[57] ABSTRACT

A control lever assembly for a lawn mower has a main lever and an auxiliary lever pivotably mounted on lawn mower handle. The main lever is operatively connected through spring biased wire to tend to open a clutch and apply a brake for a rotary cutter of the lawn mower. The auxiliary lever when manually held against the mower handle pushes a resilient arm on the main lever out of engagement with a first stop on the body, thereby automatically causing the main lever to connect the clutch and disengage the brake. A spring biased second movable stop on the auxiliary lever is received in a recess in the main lever to detent the main lever in the locked position for operation of the mower. When the auxiliary lever is released manually by the operator, the second movable stop carried thereby is retracted out of the recess on the main lever to automatically return the wire to disconnect the clutch and engage the brake.

3 Claims, 2 Drawing Figures

4,503,958

CONTROL LEVER ASSEMBLY FOR LAWN MOWERS

TECHNICAL FIELD

The present invention relates to a control lever assembly mounted on a handle of a lawn mower for stopping a rotary cutter quickly when a hand grip is released.

BACKGROUND OF THE INVENTION

Known lawn mowers include a control lever which the operator has to actuate to stop a rotary cutter blade of the lawn mower. Such control lever has proven unsatisfactory as the rotary cutter cannot reliably be stopped unless the control lever is firmly gripped by the operator. Failure of firm and quick gripping of the control lever may well be dangerous when an emergency need arises for stopping the rotary cutter.

SUMMARY OF THE INVENTION

It is an object of the present invention to provide a control lever assembly for use on lawn mowers which can quickly and reliably stop the rotary cutter upon release.

Another object of the present invention is to provide a lawn mower control lever assembly which allows the operator to stop the rotary cutter simply by manual release for increased safety against dangers.

A control lever assembly is provided for use on a lawn mower having a clutch and a brake for a rotary cutter comprises a base body mounted on a handle of the lawn mower with a first stop, and a main brake-clutch actuating lever angularly movably mounted on the body to engage the stop with brakes actuated and clutch disengaged and to move past the stop to a free state operation position with the brakes off and clutch engaged. An arcuate resilient lever arm rotatable with the main lever unless resiliently displaced is engageable with the first stop to prevent counterclockwise angular movement of the main lever in a first direction. The main lever has a recess for engagement with a further stop retaining the lever in a running position with clutch engaged and brake off. A cable assembly including a wire having one end retained in the main lever urges the lever clockwise. The other end of the cable is connected to the clutch and brake and is spring biased to actuate the brake and release the clutch.

An auxiliary lever is pivotably mounted on the body and has a projection upon clockwise movement of the auxiliary engageable with the arcuate resilient main lever arm to resiliently displace the latter to avoid the first stop and move counterclockwise. The auxiliary lever carries a second movable stop spring-biased for engagement in the recess of the main lever when it is pivoted counterclockwise to pull the wire for connecting the clutch and disengaging the brake. The auxiliary lever is spring-biased in a counterclockwise direction to retract the second stop out of the recess upon manual release of the auxiliary lever, whereby the main lever moves clockwise to allow the wire to disconnect the clutch and engage the brake automatically when the manual grip on the auxiliary lever is released.

The above and other objects, features and advantages of the present invention will become more apparent from the following description when taken in conjunction with the accompanying drawings in which a preferred embodiment of the present invention is shown by way of illustrative example.

DETAILED DESCRIPTION OF THE INVENTION

Figure 1:
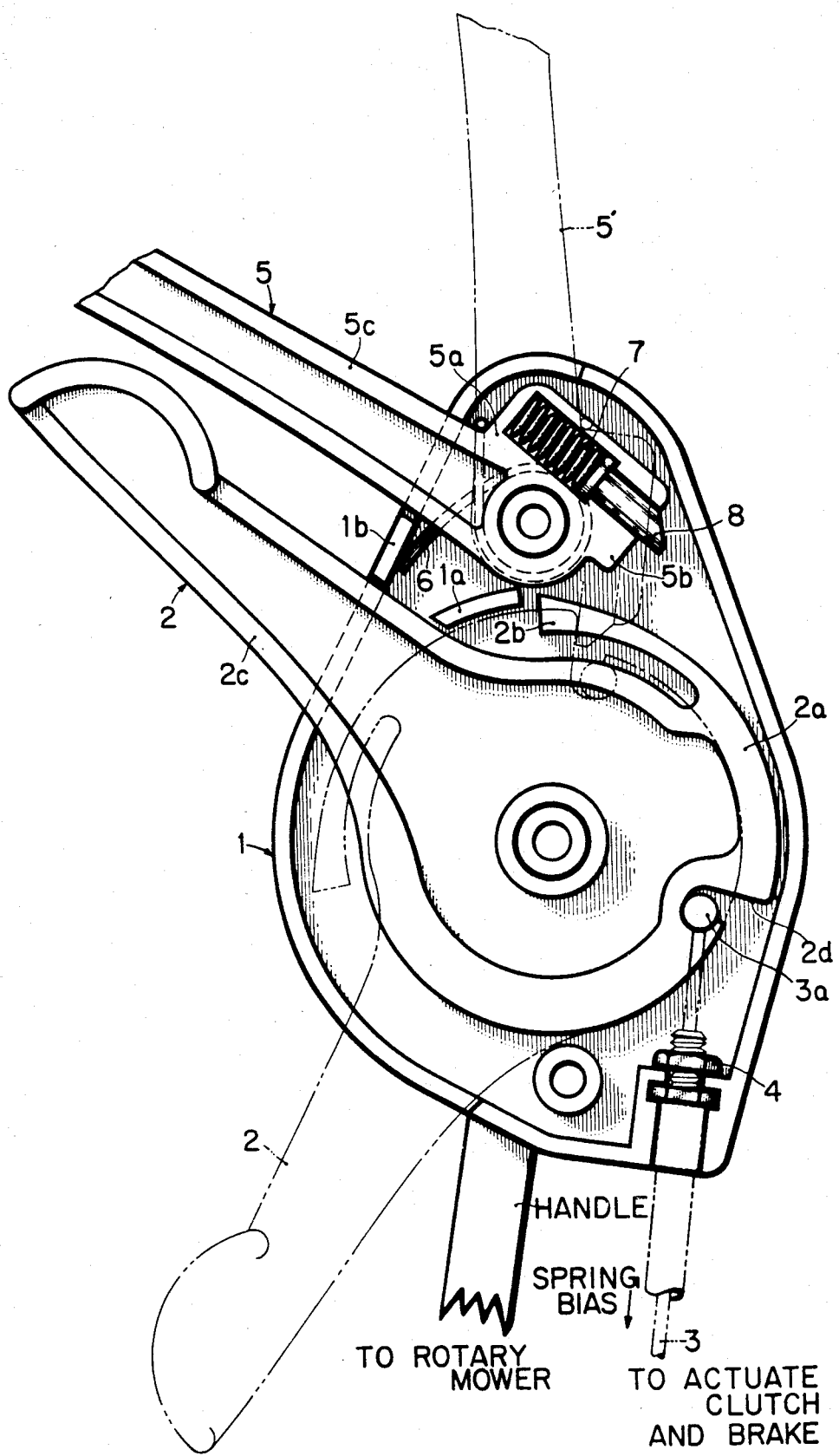
FIG. 1 is a plan view of a control lever assembly in non-actuated position, with a cover removed, for use on a lawn mower according to the present invention.

As shown in FIG. 1, a control lever assembly for attachment to a handle of a lawn mower (not shown) includes a flat body or base 1 with a cover removed for the ease of illustration, the body 1 having a first stop 1a. A main lever 2 is pivotably movably mounted on the body 1 and has a substantially circular proximal end portion 2a disposed on the body 1 and including an arcuate resilient arm 2b extending along an outer periphery of the proximal end portion 2a. The arcuate resilient arm 2b has a distal end positioned normally in confronting relation to and engageable in its free (unflexed) state with the first stop 1a.

A cable assembly includes a wire 3 having one end 3a retained in the proximal end portion 2a of the main lever 2 and the other end connected to a clutch and a brake of an internal combustion engine (not shown) installed on the lawn mower. The cable assembly also has a sheath attached to an end of the body 1 by a retainer nut 4. The main lever 2 is normally urged by the cable assembly to turn clockwise as shown in FIG. 1. The main lever 2 includes a lever arm 2c which in its clockwise position abuts against an outer wall ridge 1b of the body 1 to prevent further clockwise angular displacement of the lever 2. The main lever 2 also has a recess 2d defined adjacent to the end 3a of the wire 3 for engagement with a second stop 8 (described below).

An auxiliary lever 5 is angularly movably mounted on the body 1 adjacent to the main lever 2 and has a lever arm 5c normally urged by a spring 6 to turn counterclockwise into abutment against a stop ridge on the outer wall 1b of the body 1. The auxiliary lever 5 includes a proximal end portion 5a having a pivotably projection 5b located contigious with the body 1 in the vicinity of the arcuate resilient arm 2b as it is disposed in the solid-line position. The second stop 8 is slidably mounted in the projection 5b and normally biased by a spring 7 to project resiliently from an end of the projection 5b.

Figure 2:
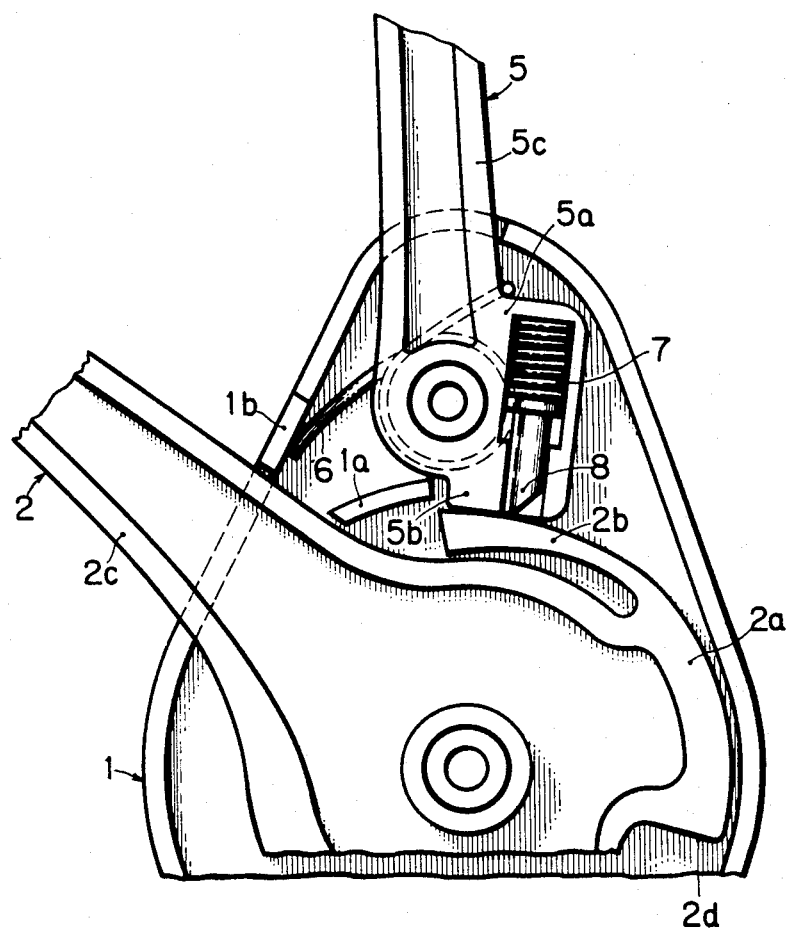
FIG. 2 is a fragmentary plan view of the control lever assembly shown in FIG. 1, in position.

The control lever assembly thus constructed will operate as follows: In FIG. 1, when the rotary cutter of the lawn mower is stopped, the parts of the control lever assembly are in the solid-line position. At this time, the distal end of the arcuate resilient arm 2b is held in abutment against the first stop 1a on the body 1, and hence the main lever 2 cannot be turned. The auxiliary lever 5 is then angularly moved clockwise to the broken-line position 5' (shown in phantom) against the resiliency of the spring 6, whereupon the end of the projection 5b pushes the arcuate resilient arm 2b radially inwardly until the latter clears the first stop 1a, as shown in FIG. 2. The main lever 2 is now rendered angularly movable in the counterclockwise direction.

The auxiliary lever 5 is held by hand in the position of FIG. 2 by gripping the auxiliary lever arm 5c and the mower handle (not shown) together, and the main lever 2 is angularly moved by hand counterclockwise to the phantom view position 2' until the second stop 8 is forced under the resiliency of the spring 7 into engagement with the recess 2d. Simultaneously, the wire 3 is pulled by the proximal end portion 2a of the main lever 2 to connect the clutch and disengage the brake. With the second (movable) stop 8 received in the recess 2d, the main lever 2 is retained in the broken-line position even when the lever 2 is released of the manual force. The lawn mower is now in operation.

Where there is a need for stopping the rotary cutter of the lawn mower as in an emergency, the handle and the auxiliary lever 5 is released of a hand grip to let the auxiliary lever 5 return to the solid-line position under the force of the spring 6. Therefore, the movable stop 8 is retracted out of the recess 2d allowing the main lever 2 to move back to the solid-line position under the pull of the wire 3 which is now displaced back to disconnect the clutch and actuate the brake, stopping the rotary cutter immediately.

With this arrangement, the main lever 2 cannot be turned unless the auxiliary lever 5 is pulled toward the handle until the projection 5b pushes the arcuate resilient arm 2b. Since the auxiliary lever 5 has a large leverage, it can retain the main lever 2 in the locked position even if the pulling force of the wire 3 is relatively strong. The parts of the control lever assembly of the invention may be shaped to a flat contour so that the control lever can be installed on either a lefthand handle member or a righthand handle member. While the main lever 2 is being pulled back to the solid-line position by the wire 3, the end of the arcuate resilient arm 2b is moved into engagement with the first stop 1a, so that the shock can be dampened which would be caused upon return of the main lever 2.

Although a certain preferred embodiment has been shown and described in detail, it should be understood that many changes and modifications may be made therein without departing from the scope of the appended claims.

I claim:

1. A control lever assembly for use on a lawn mower having a handle, a rotary cutter and a brake for the rotary cutter biased into engaged position and releasable by a wire cable extending therefrom when moved to overcome the brake bias, comprising:
   a mechanism adapted to be mounted on the handle and having a base member defining a first stop member;
   a main lever pivotably mounted on said base and having a displaceable arm engageable with said first stop to prevent pivotable movement of said main lever;
   said main lever defining a first detent member engageable with a second stop;
   a cable assembly including said wire cable having one end retained in said main lever biased by said brake to urge the main lever in the direction of said first stop and connected to disengage the brake by rotation of said main lever in a direction opposite the bias;
   an auxiliary lever pivotably mounted on said base and having a projection engageable upon angular movement with said displaceable arm to displace the latter clear of engagement with said first stop for allowing said main lever to turn in response to means biased;
   said auxiliary lever having a second detent member engageable with said first detent member when said main body is pivotably moved beyond said first stop;
   and means biasing said auxiliary lever to retract said second detent member out of said recess upon manual release of said auxiliary lever after the brake has been disengaged by rotation of the main lever, whereby said main lever is automatically pivoted to engage the brake when said auxiliary lever is released manually.

2. A control lever assembly according to claim 1, wherein said main lever has a substantially circular proximal end portion disposed on said body having thereon an arcuate resilient arm extending along an outer periphery of said proximal end portion to comprise said displaceable arm.

3. A control lever assembly according to claim 1, wherein said auxiliary lever has a proximal end portion including said projection, said second detent member comprising a slidably mounted member biased to extend from said projection.

* * * * *

UNITED STATES PATENT OFFICE
CERTIFICATE OF CORRECTION

PATENT NO. : 4,503,958
DATED : March 12, 1985
INVENTOR(S) : Tadashi Nishio

It is certified that error appears in the above–identified patent and that said Letters Patent are hereby corrected as shown below:

On the title page;

In the Assignees, please correct the assignee

"Nissan Kogyo Co., Ltd." to read

--Nissin Kogyo Co., Ltd.--.

Signed and Sealed this

Thirtieth Day of July 1985

[SEAL]

*Attest:*

DONALD J. QUIGG

*Attesting Officer*      *Acting Commissioner of Patents and Trademarks*